(12) United States Patent
Oki et al.

(10) Patent No.: US 6,879,132 B2
(45) Date of Patent: Apr. 12, 2005

(54) SWITCHING POWER SUPPLY UNIT

(75) Inventors: Kazuhiro Oki, Nagano (JP); Shizuko Hiryu, Shiga (JP); Yoshiaki Kohno, Shiga (JP); Toshitsugu Mito, Yamato (JP); Tetsuya Hinata, Tokyo (JP)

(73) Assignees: Fuji Electric Co., Ltd., Kawasaki (JP); International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/407,912

(22) Filed: Apr. 7, 2003

(65) Prior Publication Data

US 2003/0220026 A1 Nov. 27, 2003

(30) Foreign Application Priority Data

Apr. 15, 2002 (JP) ........................................ 2002-111859
Feb. 3, 2003 (JP) ........................................ 2003-026417

(51) Int. Cl.$^7$ ............................................ H01M 10/46
(52) U.S. Cl. ....................................................... 320/128
(58) Field of Search ................................ 320/128, 166, 320/120, 122, 119, 124, 131, 132, 136, 140

(56) References Cited

U.S. PATENT DOCUMENTS 5,744,936 A * 4/1998 Kawakami .................. 320/120

FOREIGN PATENT DOCUMENTS

| JP | 11-098829 | 4/1999 |
|----|-----------|--------|
| JP | 11-136943 | 5/1999 |
| JP | 2000-014043 | 1/2000 |
| JP | 2002-027683 | 1/2002 |

* cited by examiner

Primary Examiner—Edward H. Tso

(57) ABSTRACT

A switching power supply unit which contains a secondary battery for backup and a circuit for controlling the charging and discharging of the secondary battery in its enclosure and which properly manages the charging and discharging of the secondary battery. A switching power supply circuit includes a rectifying and smoothing circuit for smoothing alternating-current input from commercial power supply Vin at normal operation time, a battery pack charged by a DC—DC converter which can continuously output a predetermined direct-current power supply voltage for supplying power supply voltage to the DC—DC converter at the time of a stoppage in alternating-current input, a charging circuit section for controlling the charging and discharging of the battery pack, and a charging and discharging control circuit. The battery pack and circuits, such as the DC—DC converter, are mounted in the same unit enclosure.

15 Claims, 6 Drawing Sheets

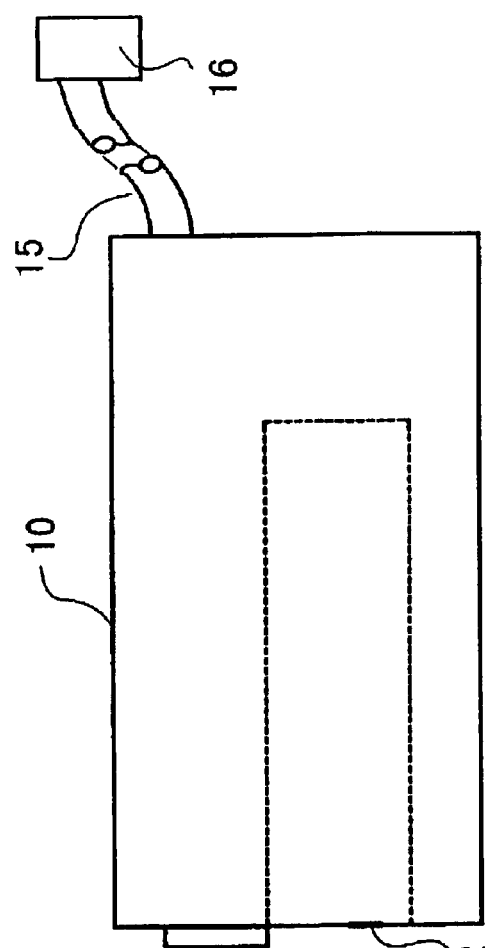
FIG. 1B
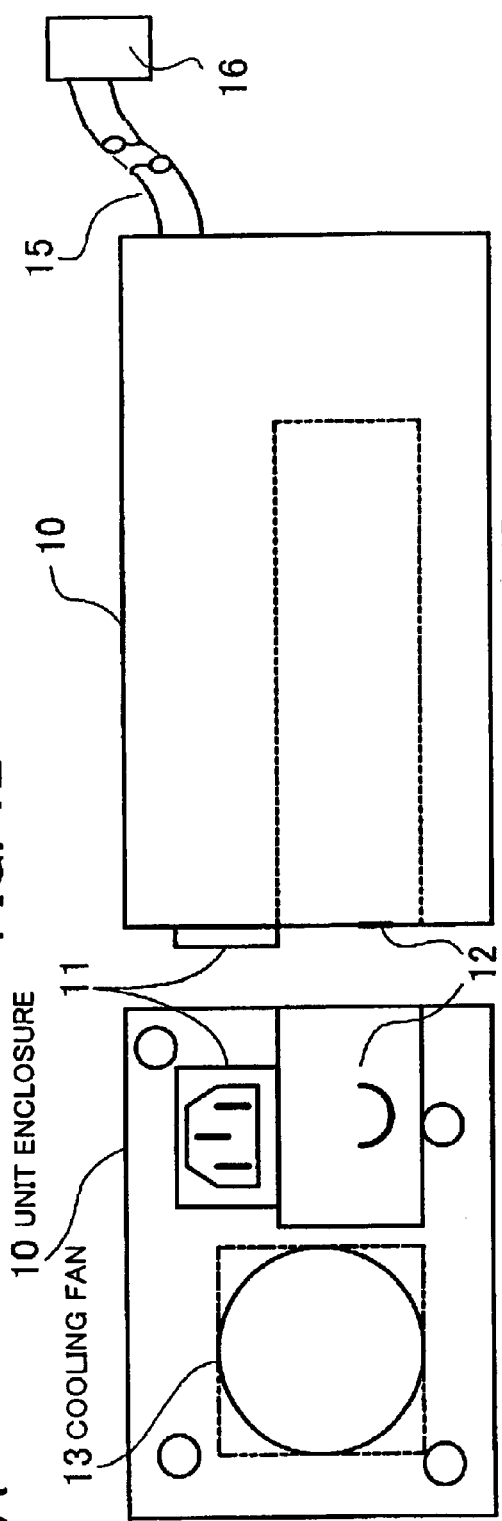
FIG. 1A
FIG. 1C
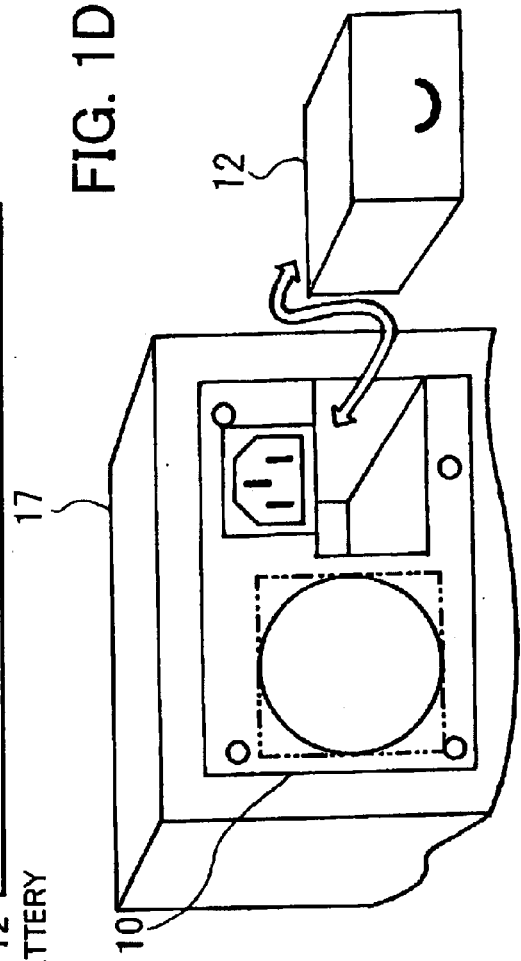
FIG. 1D
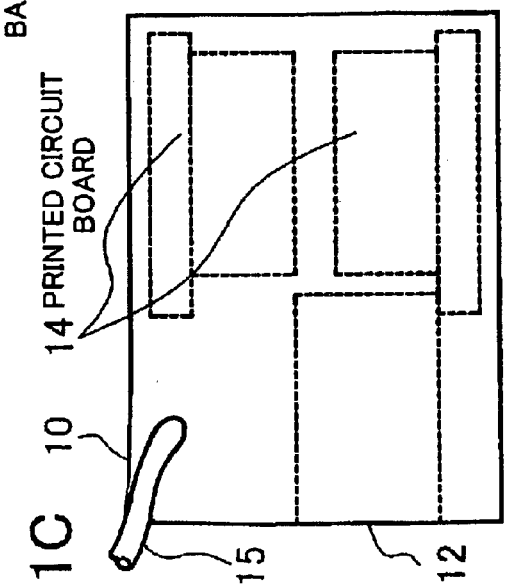

SWITCHING POWER SUPPLY UNIT

BACKGROUND OF THE INVENTION (1) Field of the Invention

This invention relates to a switching power supply unit with a battery backup function by a secondary battery for obtaining a predetermined direct-current power supply voltage at the time of, for example, a stoppage in commercial power supply and, more particularly, to a switching power supply unit which can stably continue the supply of power to units, such as an information processing unit, connected thereto even in case of a stoppage in alternating-current input from commercial power supply.

(2) Description of the Related Art

A power failure, such as a stoppage in power supply, or a fault may occur at any time in a power supply unit which uses input from commercial power supply. Such a situation can not be expected easily. If a backup of data in an information processing unit, such as a personal computer system, is not stored in a nonvolatile storage medium, then it will be lost when such a power failure occurs. If a power failure or a fault continues for several tens of milliseconds or more, a personal computer may lose data.

One of solutions to this problem is to use an uninterruptible power supply (UPS). If a UPS is used, the supply of power to a personal computer, a server, or a mainframe can be continued when the supply of power from commercial power supply is disturbed or stopped. That is to say, a computer system can maintain its normal operation state without an interrupt to a user. However, there is a limit to time for which a UPS can supply power to a computer system.

Therefore, if a power failure continues for time longer than time for which a UPS can supply power (that is to say, when electric charges stored in a UPS run out), the supply of power to a computer system is stopped and data and an application which are now used or displayed will be damaged. Moreover, a UPS is expensive and usually commercial users use it. Furthermore, the longer a UPS can supply power, the more expensive it becomes. Therefore, most of small-scale businesses and domestic users cannot buy a UPS, so the possibility that they will lose data at the time of a power failure or a fault becomes greater.

For example, Japanese Patent Laid-Open Publication No. 2000-14043 therefore discloses a built-in uninterruptible power supply for computers which operate by commercial power supply. This type of uninterruptible power supply can be integrated into a personal computer system having a power management mechanism, such as suspend/resume. If an alternating-current power failure has occurred, a reliable low-priced power supply backup system should be used to hold data.

A UPS is connected to the outside of an information processing unit and is used. This needs unit space. Moreover, a UPS is expensive. Conventionally, the use of a stabilized DC power supply with a backup function therefore has been considered. For example, Japanese Patent Laid-Open Publication No. 2002-27683 discloses an electronic unit with a backup power supply the system structure of which is simplified by making it unnecessary to use an uninterruptible power supply.

With conventional backup power supplies, however, a switch for prohibiting discharging is contained in a battery pack and one terminal is used for charging and discharging. Therefore, it is difficult to restrain a leakage current from flowing from a battery to a converter section. Moreover, the size of a switching power supply unit with a backup power supply will increase if a battery is contained in a unit enclosure. Therefore, many switching power supply units with a backup power supply do not contain a battery. In addition, the structure in which a switching power supply circuit is mounted in, for example, a drive bay in the enclosure of an information processing unit has been adopted, so extra mounting space and wirings are necessary.

A dedicated bay (slot) for mounting a battery is also necessary, especially if a switching power supply circuit is mounted in a bay. As a result, the entire battery pack becomes expensive.

Furthermore, unlike a server or a personal computer used in a room equipped with an air conditioner, a secondary battery used for factory automation (FA) has following problems. If a secondary battery is used at an extremely high ambient temperature, the life will shorten. If a secondary battery is used at an extremely low ambient temperature, its internal impedance will increase and sufficient power will not be obtained.

SUMMARY OF THE INVENTION

An object of the present invention is to provide a switching power supply unit which contains a secondary battery for backup and a circuit for controlling the charging and discharging of the secondary battery in its enclosure and which can properly manage the charging and discharging of the secondary battery.

Another object of the present invention is to provide a switching power supply unit which can obtain stable direct-current power supply voltage in spite of a change in ambient temperature by properly managing the temperature of a secondary battery contained as a backup power supply.

In order to achieve the above objects, a switching power supply unit with a battery backup function by a secondary battery for obtaining a predetermined direct-current power supply voltage at the time of, for example, a stoppage in commercial power supply is provided. This switching power supply unit comprises a stabilized power supply circuit for smoothing alternating-current input from the commercial power supply and for converting the smoothed input to the predetermined direct-current power supply voltage which can continuously output the predetermined direct-current power supply voltage at normal operation time and a power supply control circuit charged by the stabilized power supply circuit, including a direct-current power supply section for supplying power supply voltage to the stabilized power supply circuit at the time of a stoppage in the alternating-current input and a power supply control section for controlling the charging and discharging of the direct-current power supply section, and mounted in an enclosure in which the stabilized power supply circuit is mounted.

In the present invention a battery pack including a secondary battery for backup and a circuit for controlling the charging and discharging of the secondary battery is contained in an enclosure where a stabilized direct-current power supply circuit is mounted. By doing so, a switching power supply unit suitable for an information processing unit can be realized.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIGS. 1A, 1B, 1C and 1D are an external view showing a switching power supply unit with a built-in battery according to an embodiment of the present invention.

DESCRIPTION OF THE PREFERRED EMBODIMENT

Figure 2:
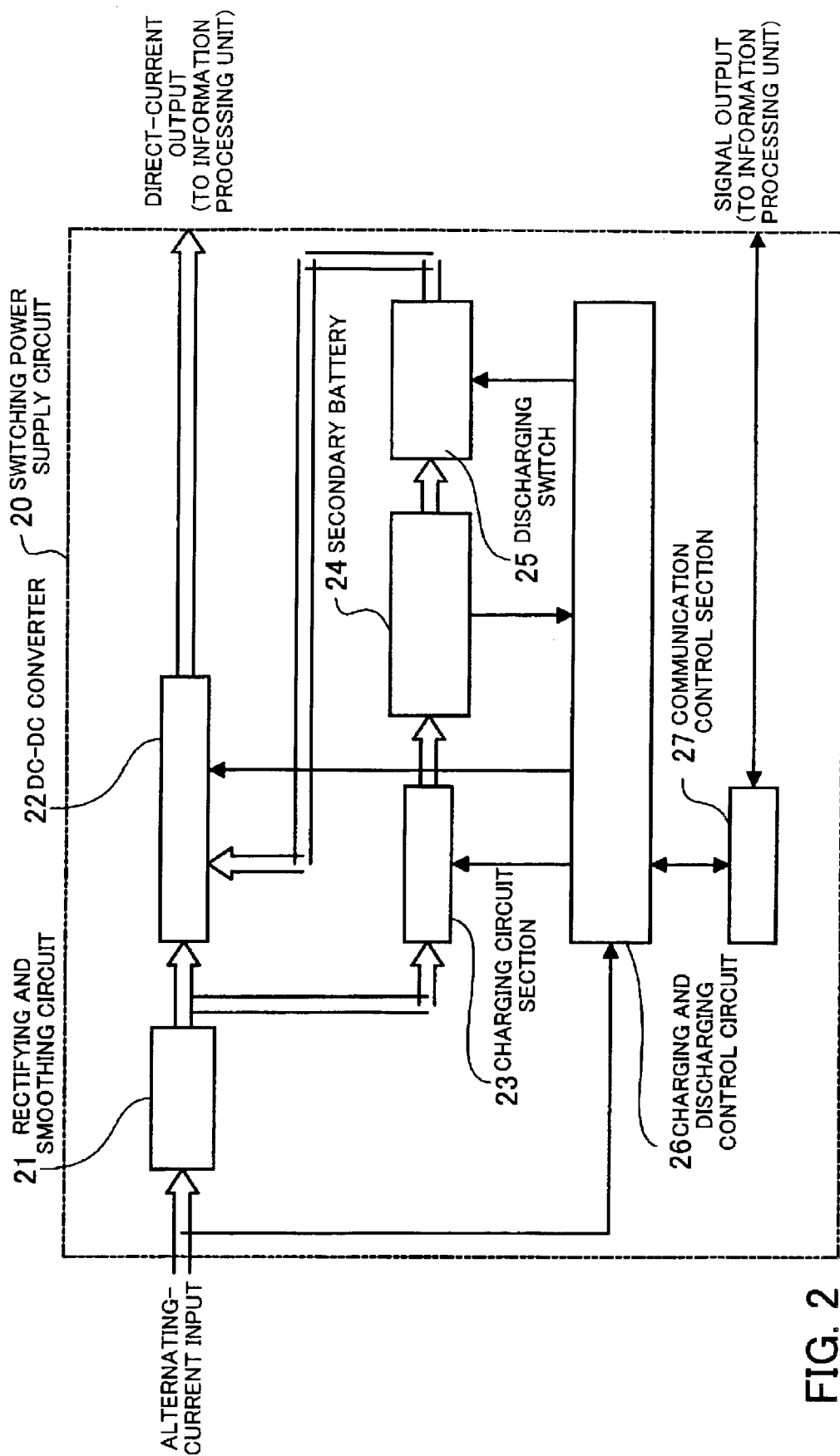
FIG. 2 is a block diagram showing the schematic structure of a switching power supply circuit with a built-in secondary battery.

An embodiment of the present invention will now be described with reference to the drawings.

FIGS. 1A, 1B, 1C and 1D are an external view showing a switching power supply unit with a built-in battery.

FIG. 1A shows the state of the front of a unit enclosure 10 on which a power supply connector 11 for alternating-current input to the switching power supply unit is formed. A lithium ion battery 12, a cooling fan 13, and a plurality of printed circuit boards 14 are located in the unit enclosure 10.

Conventionally, lead-acid batteries have chiefly been used as secondary batteries for backup in case of alternating-current power failure. However, lead-acid batteries are bulky, their lives are short, and there is a danger that fluid will leak out. In the present invention the lithium ion battery 12 therefore is used as a secondary battery for backup. With the lithium ion battery 12, a positive electrode is made from lithium cobaltate ($LiCoO_2$) and a negative electrode is made from graphite (carbon). Each electrode has a structure in which several plates are piled up. The energy density per volume of the lithium ion battery 12 is 400 Wh/1, which is nearly two times that of a nickel-cadmium battery or a nickel metal hydride battery. The lithium ion battery 12 is small and light and therefore is most suitable as a power supply for portable equipment.

In addition to the lithium ion battery 12, a nickel metal hydride battery can be used as a secondary battery for backup. In the present invention, however, a lithium ion battery is adopted because it is superior especially in capacity per volume rate. By adopting the lithium ion battery 12, the entire battery pack can be made small and be housed easily in the unit enclosure 10 of the switching power supply unit.

The cooling fan 13 cools the inside of the switching power supply unit to prevent the degradation of the lithium ion battery 12. The higher ambient temperature is, the more rapidly the lithium ion battery 12 is degraded. Therefore, as described later, temperature management is important to charge or discharge the lithium ion battery 12.

FIG. 1B is a side view of the switching power supply unit with a built-in battery. As shown in FIG. 1(B), a cable 15 is drawn out from the rear of the unit enclosure 10. The cable 15 has an output connector 16 at the end. The output connector 16 is connected to a power supply terminal inside an enclosure 17 of an information processing unit to supply direct-current power to the information processing unit. Moreover, information regarding the voltage of the lithium ion battery 12, ambient temperature, how the switching power supply unit is controlled, etc. can be provided to the information processing unit via the output connector 16 or another connector (not shown). This enables a display means connected to the information processing unit to display various pieces of information at normal operation time and enables an automatic shutdown of the information processing unit according to the amount of remaining energy in the lithium ion battery 12 at the time of, for example, a stoppage in power supply.

As shown in FIG. 1C, the printed circuit boards 14, together with the lithium ion battery 12, are housed in the unit enclosure 10. A stabilized power supply circuit including a rectifying and smoothing circuit and a DC—DC converter for converting power and a power supply control circuit including a direct-current power supply section charged by the stabilized power supply circuit and a power supply control section for controlling the charging and discharging of the direct-current power supply section are formed on the printed circuit boards 14. The stabilized power supply circuit and power supply control circuit will be described later.

As shown in FIG. 1D, even after the switching power supply unit is fitted into an enclosure 17 of the information processing unit, only the lithium ion battery 12 can be pulled out from the side of the unit enclosure 10 where the power supply connector 11 is located. As a result, the lithium ion battery 12 can be replaced without removing the unit enclosure 10 itself from the enclosure 17 of the information processing unit. Furthermore, the unit enclosure 10 houses the lithium ion battery 12. Therefore, there is no need to locate a battery's own bay in the enclosure 17 of the information processing unit and the work of connecting the lithium ion battery 12 and the unit enclosure 10 in the enclosure 17 of the information processing unit is unnecessary.

Now, a switching power supply circuit included in the switching power supply unit according to the present invention will be described.

FIG. 2 is a block diagram showing the schematic structure of a switching power supply circuit with a built-in secondary battery.

A switching power supply circuit 20 includes a rectifying and smoothing circuit 21 for smoothing alternating-current input from commercial power supply, a DC—DC converter 22 for converting to a predetermined direct-current power supply voltage and for supplying direct-current output to an information processing unit, a charging circuit section 23, a secondary battery 24 the charging of which is controlled by the charging circuit section 23, a discharging switch 25 for outputting direct-current power supply voltage from the secondary battery 24, a charging and discharging control circuit 26, and a communication control section 27 for outputting a signal to the information processing unit.

The rectifying and smoothing circuit 21 and DC—DC converter 22 smooth alternating-current input from commercial power supply and converts it to a predetermined direct-current power supply voltage at normal operation time and make up the stabilized power supply circuit which can output the predetermined direct-current power supply voltage continuously. The secondary battery 24 is the direct-current power supply section for charging and accumulating power supplied from the stabilized power supply circuit and supplies power supply voltage to the stabilized power supply circuit at the time of a stoppage in alternating-current input. The charging circuit section 23 for controlling the charging and discharging of the direct-current power supply section, the discharging switch 25, and the charging and discharging control circuit 26 make up the power supply control section for the secondary battery 24.

Now, charging and discharging operation in the switching power supply circuit 20 will be described.

In the switching power supply circuit 20 shown in FIG. 2, the flow of power is shown by double shafted arrows and the flow of signals is shown by arrows. The direct-current power supply section and power supply control section included in the switching power supply circuit 20 make up the power supply control circuit on the printed circuit boards 14 shown in FIG. 1. This is the same with the stabilized power supply circuit. The direct-current power supply section and power supply control section, together with the secondary battery 24, are mounted in the unit enclosure 10.

In the switching power supply circuit 20, alternating-current input from the power supply connector 11 shown in FIG. 1 is converted to direct-current power by the rectifying and smoothing circuit 21 and the direct-current power is supplied to the DC—DC converter 22. This direct-current power is also supplied to the charging circuit section 23 and then is accumulated in the secondary battery 24. The secondary battery 24 has a charging route and a discharging route separately and power accumulated in the secondary battery 24 by charging will be discharged by the discharging switch 25.

The secondary battery 24 informs the charging and discharging control circuit 26 about a rise in output voltage caused by charging or a rise in temperature caused by discharging and the charging and discharging control circuit 26 exercises on-off control over the charging circuit section 23 and discharging switch 25. As a result, power necessary for battery backup will be charged in the secondary battery 24. Accordingly, electric charges accumulated in the secondary battery 24 are discharged to the DC—DC converter 22 at the time of, for example, a stoppage in commercial power supply so that a predetermined direct-current power supply voltage can be obtained by the DC—DC converter 22.

The state of charging control in the charging circuit section 23, the discharging state of the secondary battery 24, etc. are exchanged properly between the charging and discharging control circuit 26 and the information processing unit via the communication control section 27. The switching power supply unit having such a battery backup function can stably continue the supply of power to units, such as an information processing unit, connected thereto even at the time of a stoppage in alternating-current input from commercial power supply. Therefore, the information processing function of an information processing unit etc. is not damaged by a stoppage in power supply. In addition, data stored in them is held reliably.

Now, the structure of the feature of the switching power supply circuit will be described.

Figure 3:
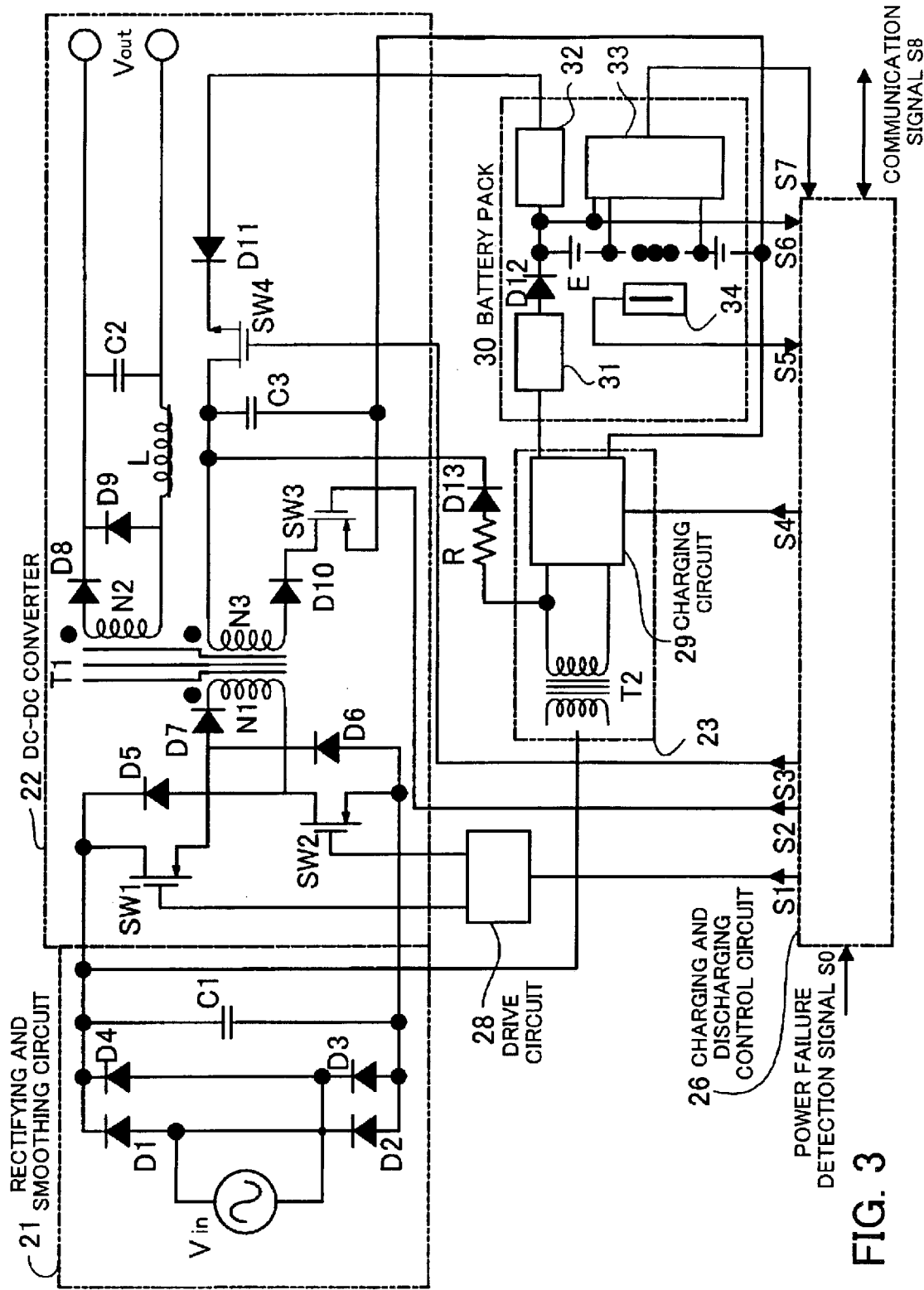
FIG. 3 is a circuit diagram showing the specific structure of the feature of the switching power supply circuit.

FIG. 3 is a circuit diagram showing the specific structure of the feature of the switching power supply circuit.

The rectifying and smoothing circuit 21 includes a rectifying bridge of diodes D1 through D4 for rectifying commercial power supply Vin, which it received via the power supply connector 11 shown in FIG. 1, and a capacitor C1 for smoothing. The rectifying and smoothing circuit 21 converts alternating-current input (of 100–240 V, for example), being main power supply, to direct-current power by rectifying and smoothing and supplies it to the DC—DC converter 22.

The DC—DC converter 22 includes a conversion transformer T1 including three windings (windings N1, N2, and N3), an input circuit on the winding N1 side including two switching elements SW1 and SW2 each including an FET and three diodes D5 through D7, an output circuit on the winding N2 side including a rectifier diode D8, a commutation diode D9, a choke coil L, and a smoothing capacitor C2 on the output side, and an input circuit on the winding N3 side including two switching elements SW3 and SW4 each including an FET, two diodes D10 and D11, and a capacitor C3. In FIG. 3, a two-switching-element converter using the switching elements SW3 and SW4 is adopted. However, a one-switching-element converter may be used.

At normal operation time the rectifying and smoothing circuit 21 smooths commercial power supply Vin and supplies direct current to the DC—DC converter 22. The DC—DC converter 22 applies the supplied direct-current voltage to the winding N1 in the conversion transformer T1 as intermittent voltage by turning on or off the switching elements SW1 and SW2, smooths voltage generated across the winding N2 by the output circuit on the winding N2 side, and obtains a desired direct-current output voltage Vout (12 Vdc, for example). A plurality of windings N2 may be located at need in the conversion transformer T1 to obtain a plurality of direct-current output voltages Vout. Moreover, another winding which differs from the winding N2 in the number of turns may be located to obtain different direct-current output voltages (12 Vdc and 5 Vdc, for example).

A drive signal S1 is supplied from the charging and discharging control circuit 26 to the DC—DC converter 22 via a converter drive circuit 28 to exercise on-off control over the switching elements SW1 and SW2 included in the input circuit on the winding N1 side. The charging and discharging control circuit 26 receives a power failure detection signal S0. Moreover, by, for example, informing about information regarding a stoppage in power supply and an advance notice to stop backup by drive signals S1 and S2 for driving primary and secondary converters respectively, a discharging control signal S3, a charging control signal S4, and a communication signal S8 exchanged with the information processing unit, the charging and discharging control circuit 26 disconnects power supply safely in accordance with instructions from the information processing unit to disconnect. In addition, a temperature detection signal S5, a battery voltage detection signal S6, a cell voltage anomaly detection signal S7, etc. are input to the charging and discharging control circuit 26.

The charging circuit section 23 includes a conversion transformer T2 and a charging circuit 29. Direct-current output from the rectifying and smoothing circuit 21 is supplied to the charging circuit 29 via the conversion transformer T2. The charging control signal S4 is supplied from the charging and discharging control circuit 26 to the conversion transformer T2. Moreover, the charging circuit 29 charges the capacitor C3 via a resistor R and diode D13 connected in series and charges the battery pack 30. Control over the charging of the battery pack 30 will be exercised according to a charging sequence composed of preliminary charging and rapid charging, which will be described later.

The battery pack 30 is the direct-current power supply section including a charging protection circuit 31, a diode D12, a discharging protection circuit 32, a cell voltage monitoring circuit 33, a battery temperature sensor 34, and a plurality of lithium ion battery cells E. The battery pack 30 has a charging route and a discharging route separately. The battery pack 30 is connected so that it will supply direct-current power supply voltage to the input circuit on the winding N3 side in the DC—DC converter 22 at the time of a stoppage in commercial power supply.

Now, discharging operation at the time of a stoppage in power supply will be described.

The input circuit on the winding N3 side in the DC—DC converter 22 is connected to the battery pack 30 via the diode D10 and switching element SW3 and power supply voltage is supplied from the battery pack 30 via the diode D11 and switching element SW4. At the time of a stoppage in commercial power supply Vin, the charging and discharging control circuit 26 receives a power failure detection signal S0 and outputs a discharging control signal S3. As a result, the switching element SW4 is turned on. Moreover, the switching element SW3 is turned on by a drive signal S2 for driving the secondary converter and the supply of power from the battery pack 30 to the winding N2 in the conversion transformer T1 via the winding N3 is begun.

When commercial power supply Vin is supplied to the DC—DC converter 22 at normal operation time, power supplied to the winding N2 in the conversion transformer T1 via the winding N1 is output as a predetermined direct-current power supply voltage Vout. At this point in time, the switching element SW4, together with the switching element SW3, is turned off to prohibit the discharging of the battery pack 30. With a conventional battery pack, one terminal has been used both as a charging terminal and as a discharging terminal and a discharging prohibition switch has been housed in the battery pack. With the switching power supply circuit 20, however, the switching element SW4 including an FET is located in the DC—DC converter 22 as a discharging prohibition switch and is used both as a discharging prohibition switch and as a discharging control switch on the DC—DC converter 22 side. As a result, a discharging prohibition switch in the battery pack 30 becomes unnecessary.

Now, the battery pack including a lithium ion battery will be described.

Figure 4:
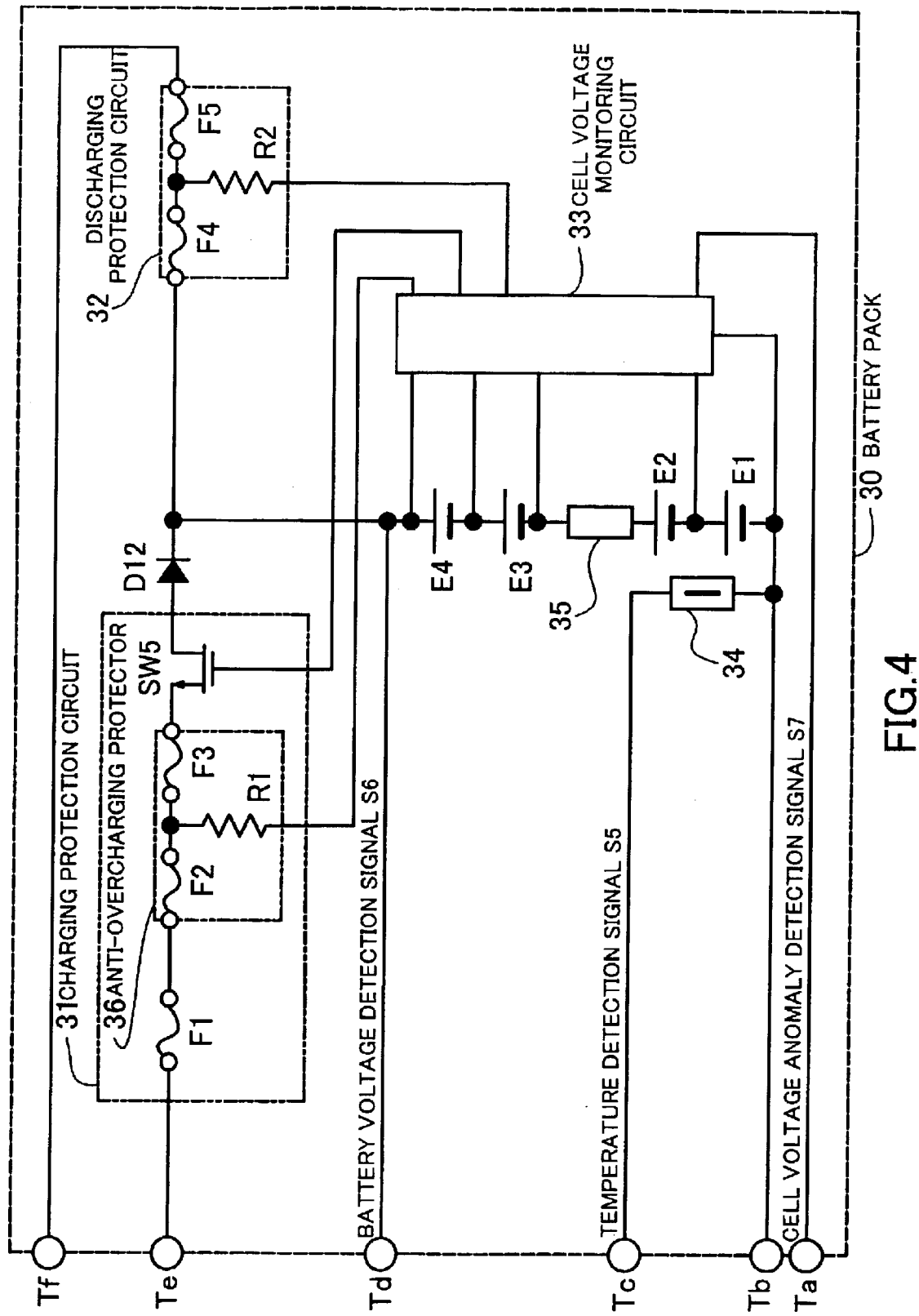
FIG. 4 is a circuit diagram showing the structure of a battery pack.

FIG. 4 is a circuit diagram showing the structure of the battery pack. The battery pack 30 has six terminals Ta through Tf as external terminals. For example, four lithium ion battery cells E1 through E4 which make up a secondary battery are connected in series in the battery pack 30. The average voltage of a lithium ion battery is 3.6 V and the required number of cells are connected in series to obtain a predetermined voltage. A short circuit protection circuit 35 of, for example, bimetal which will open when a temperature higher than or equal to a predetermined value is detected is inserted between the cells E2 and E3 included in the secondary battery. As a result, if the temperature of the lithium ion battery rises excessively, charging and discharging will be stopped.

A cell voltage anomaly detection signal S7 is output from the cell voltage monitoring circuit 33 to the terminal Ta. The terminal Tb is a ground terminal connected to the battery temperature sensor 34 and the ground side of the lithium ion battery cell E. A temperature detection signal S5 is output from the battery temperature sensor 34 to the terminal Tc and a battery voltage detection signal S6 is output to the terminal Td. The charging terminal Te is connected to the charging protection circuit 31 and the discharging terminal Tf is connected to the discharging protection circuit 32.

The charging protection circuit 31 includes a first fuse F1, an anti-overcharging protector 36, and a switching element SW5 of, for example, an FET connected in series. The anti-overcharging protector 36 includes two fuses F2 and F3 connected in series and a resistor R1 connected to the point where the fuses F2 and F3 connect.

The output side of the charging protection circuit 31 is connected to the fourth cell E4 in the lithium ion battery E via the diode D12. The fourth cell E4 in the lithium ion battery E is connected to the discharging terminal Tf via the discharging protection circuit 32. As with the anti-overcharging protector 36, the discharging protection circuit 32 includes two fuses F4 and F5 connected in series and a resistor R2 connected to the point where the fuses F4 and F5 connect.

Now, operation for charging and discharging the secondary battery in which the plurality of lithium ion battery cells are connected will be described.

Usually lithium ion batteries are superior in capacity per volume rate. However, if charging or discharging operation continues in fault mode, such as overcharging mode or over discharging mode, for a long time, the characteristics of battery cells will be degraded. Accordingly, in the present invention eight protection means are provided in the charging circuit 29 and battery pack 30 not only to detect fault mode, such as overcharging mode, but also to control so that charging or discharging will be stopped properly in the case of overcurrent flowing.

With a first protection means protection will be given by monitoring charging voltage from the charging terminal Te in the battery pack 30.

A battery voltage detection signal S6 is supplied from the battery pack 30 to the charging and discharging control circuit 26. Therefore, if a battery voltage reaches a specified value (=V1) or more, charging can be stopped by turning off a charging control signal S4 supplied to the charging circuit section 23.

With second and third protection means, the cell voltage monitoring circuit 33 monitors a battery voltage and protection will be given by the charging protection circuit 31.

The cell voltage monitoring circuit 33 is connected to a plus terminal of the lithium ion battery cell E4. If a battery voltage reaches a specified value (=V2) or more, charging can be stopped by turning off the switching element SW5 for charging included in the charging protection circuit 31. The anti-overcharging protector 36 included in the charging protection circuit 31 has the final protection function of mechanically disconnecting the charging terminal Te of the battery pack 30 from the lithium ion battery E. If a battery voltage reaches a specified value (=V3) or more, the battery pack 30 will be self-protected at charging time by disconnecting the fuse F2 or F3 included in the anti-overcharging protector 36.

With the first through third protection means the specified voltages V1 through V3 for protecting the battery at charging time are set so that the relationship of V1<V2<V3 will be obtained.

A fourth protection means copes with overcurrent at charging time.

If overcurrent flows from the charging terminal Te into the battery pack 30 at charging time, the fuse F1 included in the charging protection circuit 31 is disconnected to prevent the overcurrent from flowing to the lithium ion battery E.

With a fifth protection means, the cell voltage monitoring circuit 33 monitors a battery voltage at discharging time and protection will be given by the discharging protection circuit 32.

An overcurrent protection and abnormally disconnect signal is supplied from the cell voltage monitoring circuit 33 to the discharging protection circuit 32 to disconnect the fuse F4 or F5. Accordingly, the discharging protection circuit 32 has the final protection function of mechanically disconnecting the discharging terminal Tf of the battery pack 30 from the lithium ion battery E. This is the same with the protection given by the anti-overcharging protector 36.

With a sixth protection means protection will be given by the cell voltage monitoring circuit 33 monitoring the voltage of each cell at charging time.

The battery pack 30 is used with the four lithium ion battery cells E1 through E4 connected in series. Therefore, even if one cell fails, it cannot be detected only by monitoring the total voltage. To judge the voltage of each cell at charging time, the cell voltage monitoring circuit 33 is located. If there is an abnormality in the voltage of a cell, a cell voltage anomaly detection signal S7 is output from the detection terminal Ta to the charging and discharging control circuit 26. Therefore, even if part of the lithium ion battery cells fail, the degradation of the lithium ion battery caused by overcharging can be prevented by stopping rapid charging.

With a seventh protection means protection will be given by the short circuit protection circuit 35 inserted between the cells E2 and E3.

The short circuit protection circuit 35 is made of, for example, bimetal. If the temperature of the lithium ion battery reaches a specified value or more, the bimetal will open to prevent overcurrent the intensity of which is greater than or equal to a predetermined value from flowing through the lithium ion battery cells E1 through E4.

With an eighth protection means protection will be given by the battery temperature sensor 34 detecting the temperature of the battery.

The battery temperature sensor 34 is located near the lithium ion battery E to measure the ambient temperature of the lithium ion battery E. A temperature detection signal S5 is output from the battery temperature sensor 34, through the temperature detection terminal Tc, to the charging and discharging control circuit 26. Therefore, if the ambient temperature of the lithium ion battery E rises above a predetermined value due to high-current discharging in the lithium ion battery E, the switching element SW4 is turned off to stop discharging.

With the above first protection means, a battery voltage detection signal S6 is output from the battery pack 30 and the charging circuit section 23 located outside the battery pack 30 functions. By contrast, with the second through seventh protection means, the protection circuits 31, 32, and 35 etc. mounted in the battery pack 30 function as judgment sections. With the eighth protection means, the battery temperature sensor 34 in the battery pack 30 functions as a sensor section, the charging and discharging control circuit 26 makes a judgment, and the switching element SW4 mounted in the DC—DC converter 22 is turned off.

To restrain a rush current from flowing to the capacitor C3 on the output circuit side of the DC—DC converter 22 when the switching element SW4 turns on, the capacitor C3 is charged in advance to a voltage higher than the battery voltage of the second battery by the charging circuit section 23 via the resistor R and diode D13 connected in series during the supply of power from commercial power supply. This makes it unnecessary to locate a circuit for restraining a rush current from flowing to the capacitor C3 on the DC—DC converter 22 side and reduces the impedance of a discharging route.

If a battery is housed in the switching power supply unit, the battery will be left connected for the period from the shipment to the installation of the product. Accordingly, if a leakage current from the battery is not restrained, the over-discharging of the battery will occur and the life of the battery as a secondary battery will shorten. Therefore, when the switching power supply unit is disconnected from an information processing unit and there is no need for backup, a leakage current is restrained by turning off the switching element SW4. The switching element SW4 is latched in the OFF state by the charging and discharging control circuit 26 at the time when battery backup for the stabilized power supply circuit is stopped. Moreover, the charging and discharging control circuit 26 controls so that this latch will be released automatically at the time of the stabilized power supply circuit being restarted.

As described above, a leakage current from the battery pack 30 to the DC—DC converter 22 is restrained. As a result, the switching power supply unit can be stored or transported with the battery pack 30 mounted therein and there arises no problem with the maintenance of the switching power supply unit with a built-in battery. Whether or not the switching power supply unit is disconnected from an information processing unit can be judged by the charging and discharging control circuit 26 on the basis of a signal input to the switching power supply unit.

Moreover, with the switching power supply unit according to the present invention, an anti-discharging switch is not located in the discharging protection circuit 32 on the battery pack 30 side and the switching element SW4 for discharging control located on the DC—DC converter 22 side is also used as an anti-discharging switch. In addition, a plurality of microprotectors connected in parallel are used in the discharging protection circuit 32 in the battery pack 30 to substitute for a bulky high-current protection element. Therefore, the battery pack 30 housed in the unit enclosure 10 of the switching power supply unit can be made small without shortening the life of the lithium ion battery 12.

Now, the management of the charging of the lithium ion battery will be described.

The lithium ion battery will be charged by the use of the procedure of preliminary charging and rapid charging. The preliminary charging is a charging process in which the safety of charging is taken into consideration. In the preliminary charging, constant-current control is exercised by the use of a low electric current (0.2 amperes, for example) until a battery voltage reaches, for example, 3.2 volts. The rapid charging is a main charging process. In the first half of the rapid charging process, constant-current charging is performed by the use of a maximum charging current (maximum continues charging current determined from the performance and safety of the battery) of, for example, about 1 ampere. When a battery voltage reaches a full charging voltage (battery voltage obtained when charging capacity is 100%) of, for example, about 4.2 volts, constant-voltage charging at this full charging voltage will be begun.

In the constant-voltage charging process, with the progress of charging and therefore an increase in battery capacity, a charging current decreases. Charging will be completed when a charging current decreases to a charging completion current value (a current value at which charging is judged to be complete). This charging completion current value is set to, for example, 0.1 ampere. When a charging current decreases to 0.1 ampere, the charging capacity of the battery is about 95%. To approximate the charging capacity of the battery to 100%, constant-voltage charging called trickle charging may be performed for about one hour just after the constant-voltage charging process.

Figure 5:
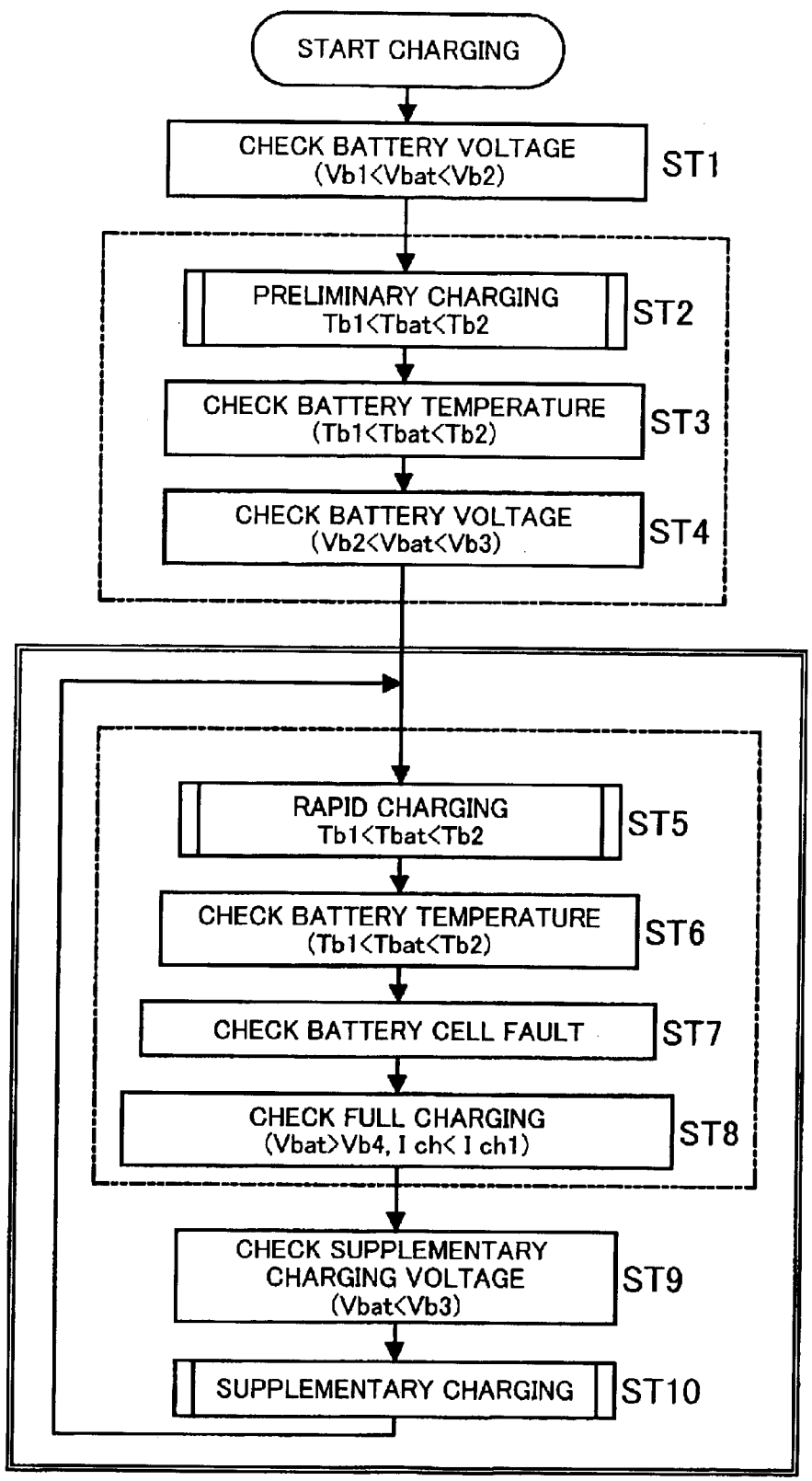
FIG. 5 is a view showing a procedure for managing the charging of a battery.

FIG. 5 is a view showing a procedure for managing the charging of the battery.

With the switching power supply unit according to the present invention, by performing charging management described below, a fault in the lithium ion battery is judged accurately, the degradation of the faulty battery caused by rapid charging and overcharging are prevented reliably, and the life of the battery is lengthened.

(1) Management of Preliminary Charging

In step ST1, a charging current Ich supplied to the battery pack 30, a battery temperature Tbat, and a battery voltage Vbat are checked to see whether there is an abnormality in the lithium ion battery.

If the battery temperature Tbat is in the specified range (of Tb1 to Tb2) and the battery voltage Vbat has not reached a lower limit voltage for shift to rapid charging Vb2 but has reached a lower limit voltage for shift to preliminary charging Vb1, then the procedure moves to step ST2 to perform preliminary charging.

If the battery temperature Tbat is not in the specified range (of Tb1 to Tb2), then preliminary charging is not begun. If the battery temperature Tbat is lower than the lower limit temperature Tb1, the lithium ion battery is not activated and therefore cannot be charged. If the battery temperature Tbat has risen above the upper limit temperature Tb2 due to discharging, the lithium ion battery cannot be charged immediately.

The battery temperature Tbat is monitored even during the preliminary charging (step ST3). If an abnormality has occurred, the charging will be stopped and a predetermined process for coping with the abnormality will be performed. If the battery voltage Vbat is judged in step ST4 to be lower than the lower limit voltage for shift to preliminary charging Vb1, a process for coping with an abnormality will also be performed. When the battery voltage Vbat reaches the lower limit voltage for shift to rapid charging Vb2, the preliminary charging is completed.

(2) Management of Rapid Charging

Next, supplementary charging or rapid charging will be performed. If the battery temperature Tbat is in the specified range (step ST3) and the battery voltage Vbat is between the lower limit voltage for shift to rapid charging Vb2 and a voltage for shift to supplementary charging Vb3 (step ST4), then rapid charging in step ST5 will be begun after the preliminary charging is completed. If the voltage of one of battery cells connected in series is lower than a specified voltage, the battery cell is judged to be faulty (step ST7) and charging will not be performed.

In step ST6, the battery temperature Tbat is monitored during the rapid charging. If an abnormality has occurred, the rapid charging will be stopped. In step ST8, when the battery voltage Vbat reaches a specified value (full charging judgment voltage Vb4) and the charging current Ich decreases to a specified value (Ich1), the battery is judged to be fully charged and the rapid charging will be stopped.

(3) Management of Supplementary Charging Voltage

If the battery voltage Vbat is higher than or equal to the voltage for shift to supplementary charging Vb3 before charging the battery, battery capacity is judged to be sufficient for backup and charging will not be performed to prevent overcharging. The voltage for shift to supplementary charging Vb3 should be set on the basis of the voltage of terminals and battery capacity so that it will correspond to capacity sufficient for backup. In this case, the number of times supplementary charging is performed must not influence the life of the battery. If battery capacity decreases due to self-discharging or a leakage current to the stabilized power supply circuit side and the battery voltage Vbat is judged in step ST9 to be lower than or equal to the voltage for shift to supplementary charging Vb3, then supplementary charging will be performed in step ST10. To simplify software, the same process that is used for rapid charging is applied to the supplementary charging.

Now, the management of the discharging of the battery will be described.

If at the time of a stoppage in commercial power supply the total voltage Vbat of the lithium ion battery is higher than or equal to a specified value, the voltage of each cell is normal, and the battery temperature Tbat is in the specified range, the switching element SW4 is turned on.

When the charging and discharging control circuit 26 detects the stoppage in power supply by a power failure detection signal S0, the charging and discharging control circuit 26 informs an information processing unit about it by a communication signal S8. When remaining battery capacity decreases to a level at which the information processing unit can be shut down without any data loss due to discharging for backup, the switching power supply unit sends the information processing unit an advance notice to stop backup by a communication signal S8 to request to shut down the information processing unit. In addition to this, when the battery temperature Tbat rises to a specified value, the switching power supply unit also sends the information processing unit an advance notice to stop backup to request to shut down the information processing unit. When the information processing unit receives this advance notice to stop backup, the information processing unit puts itself into a state in which it can be disconnected safely and then returns instructions to shutdown itself to the switching power supply unit by a communication signal S8. The switching power supply unit turns off a drive signal S2 for driving the secondary converter and a discharging control signal S3 in accordance with the instructions to shutdown the information processing unit and stops direct-current output.

When the lithium ion battery discharges and a high current flows, the temperature of each cell rises linearly. The above charging and discharging control based on the battery temperature Tbat makes use of this characteristic, so backup can be stopped accurately.

As described above, by controlling based on the detected value of battery voltage and control based on the detected value of battery temperature at the same time, the overdischarging of the lithium ion battery or an excessive rise in the temperature of the lithium ion battery can be prevented, backup by the stabilized power supply circuit can be performed safely and reliably without degrading the battery, and the life of the battery can be lengthened.

By the way, the internal impedance of secondary batteries, such as a lithium ion battery, will increase when the temperature is low. Therefore, a drop in voltage caused by a discharging current at battery backup time cannot be neglected. If a heater is used as a means for heating a battery, usually a heater drive circuit, a heater control circuit, etc. are needed. This will lead to a significant increase in costs. Therefore, by indirectly conducting heat generated by power semiconductors included in the switching power supply circuit to a battery housing section via a radiation plate for cooling, the temperature of a secondary battery should be managed properly. As a result, unnecessary costs can be avoided and a change in the ambient temperature of the switching power supply unit can be coped with.

Figure 6:
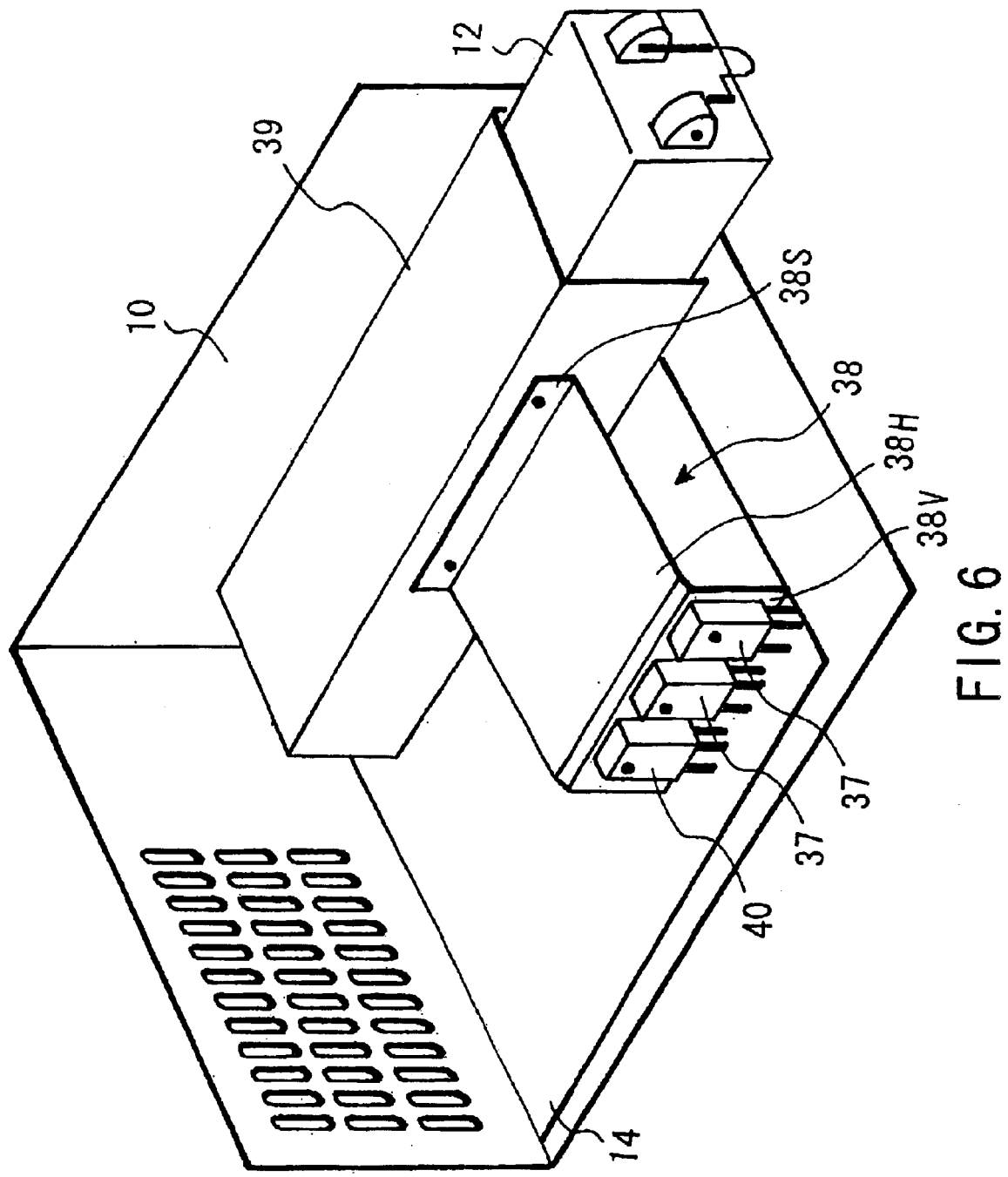
FIG. 6 is a perspective view showing the structure of a section where a lithium ion battery is housed.

FIG. 6 is a perspective view showing the structure of a section where the lithium ion battery is housed.

Two power transistors 37 shown in FIG. 6 are power semiconductor elements included in, for example, the DC—DC converter 22 in the switching power supply circuit 20 shown in FIG. 2. The power transistors 37 are mounted on the printed circuit boards 14 located in the unit enclosure 10 of the switching power supply unit and are fixed on a radiation plate for cooling (radiation plate 38) bent into the shape of the letter L. The radiation plate 38 has a vertical plane 38V with a predetermined area, a horizontal plane 38H which connects with the vertical plane 38V, and a turnup portion 38S formed by turning up the edge of the horizontal plane 38H so that heat generated by the power transistors 37 will be conducted and radiated. The turnup portion 38S is screwed onto a side of a metallic housing sheath 39 where the lithium ion battery 12 is housed. It is assumed that the temperature of the lithium ion battery 12 is low. To control the charging and discharging of the switching power supply unit, the metallic housing sheath 39, being a battery case, is heated by heat conducted from the radiation plate 38. As a result, the battery temperature Tbat can be raised independently of the ambient temperature of the switching power supply unit.

Apart from the above battery temperature sensor 34, a temperature sensor 40 for measuring the temperature of the radiation plate 38 is located on the radiation plate 38 for the power transistors 37. Moreover, to cool the printed circuit boards 14 and radiation plate 38, cooling air is supplied from a cooling fan (corresponding to the cooling fan 13 in FIG. 1) not shown in FIG. 6. Therefore, the temperature of the radiation plate 38 is monitored by the temperature sensor 40. If the temperature of the radiation plate 38 is low, then heat conduction from the radiation plate 38 to the metallic housing sheath 39 is promoted by reducing the number of revolutions of the cooling fan. In addition, if the temperature of the radiation plate 38 rises above a predetermined value due to a rise in the ambient temperature or heat generated by the power transistors 37, then a predetermined amount of cooling air is supplied from the cooling fan to return the battery temperature Tbat to a proper value. In this case, the revolving speed of the cooling fan should be changed. By making use of heat conducted from the power transistors 37 via the radiation plate 38, the charging and discharging of the secondary battery can be managed properly.

As described above, by making use of heat conducted from power semiconductor elements via the radiation plate 38 located inside the switching power supply unit, the temperature of the lithium ion battery 12 can be maintained within a constant range even if the ambient temperature changes. As a result, the charging and discharging of the secondary battery can be managed properly at a low cost. Moreover, unnecessarily heating of the lithium ion battery 12 can be prevented only by controlling the revolving speed of the cooling fan according to the temperature of the radiation plate 38 used for heat conduction.

The present invention is not limited to the above embodiment. The present invention can variously be modified and embodied without deviating from the essential points of the present invention. For example, a nickel-cadmium battery, a nickel metal hydride battery, or the like can be used as a secondary battery included in the battery pack 30 in place of a lithium ion battery. Moreover, a server, a mainframe, a recorder with a hard disk as a record medium, or the like can be used as an information processing unit in place of a personal computer.

As has been described in the foregoing, with the switching power supply unit according to the present invention a secondary battery and a circuit for controlling the charging and discharging of the secondary battery are integrally housed, a battery pack is made small, the impedance of a discharging route is made low, the charging and discharging of the secondary battery is managed properly, and the supply of power to units, such as an information processing unit, connected thereto can be continued stably even at the time of a stoppage in alternating-current input from commercial power supply.

Furthermore, with the switching power supply unit according to the present invention, heat generation due to the rapid charging of a secondary battery can be prevented and high-current discharging can be controlled reliably and safely. This lengthens the life of the secondary battery included in a battery pack.

In addition, the switching power supply unit according to the present invention has the advantage of being able to be shipped with a battery pack mounted therein because a leakage current at the time of backup being unnecessary is restrained.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A switching power supply unit with a battery backup function by a secondary battery for obtaining a predetermined direct-current power supply voltage at the time of a stoppage in alternating current input, the unit comprising:

a stabilized power supply circuit for smoothing alternating-current input from the commercial power supply and for converting the smoothed input to the predetermined direct-current power supply voltage which can continuously output the predetermined direct-current power supply voltage at normal operation time; and a power supply control circuit charged by the stabilized power supply circuit, including a direct-current power supply section for supplying power supply voltage to the stabilized power supply circuit at the time of a stoppage in the alternating-current input and a power supply control section for controlling the charging and discharging of the direct-current power supply section, and mounted in an enclosure in which the stabilized power supply circuit is mounted, wherein the direct-current power supply section includes a charging route and a discharging route separately.

2. The switching power supply unit according to claim 1, wherein the power supply control circuit includes a secondary battery which charges accumulates power supplied from the stabilized power supply circuit.

3. The switching power supply unit according to claim 2, wherein the secondary battery is a lithium ion battery in which a plurality of lithium ion battery cells are connected.

4. The switching power supply unit according to claim 3, further comprising:

a discharging control switch for controlling the connection of the stabilized power supply circuit and the power supply control circuit, wherein a leakage current from the lithium ion battery is restrained at the time of backup being unnecessary.

5. The switching power supply unit according to claim 4, wherein the discharging control switch is latched in the OFF state at the time when battery backup for the stabilized power supply circuit is stopped, further wherein the discharging control switch is controlled so that a latch will be released automatically at the time of the stabilized power supply circuit being restarted.

6. The switching power supply unit according to claim 3, wherein the direct-current power supply section includes a device for detecting the degradation of each of the lithium ion battery cells due to overdischarging, overcharging, or the like and prevents heat generation due to the rapid charging of the lithium ion battery.

7. The switching power supply unit according to claim 3, wherein the power supply control section includes a first monitoring device for monitoring the value of voltage output from the lithium ion battery and a second monitoring device for monitoring an abnormality in the voltage of each of the lithium ion battery cells and controls the rapid charging of the lithium ion battery according to the results of monitoring by the first and second monitoring devices.

8. The switching power supply unit according to claim 3, wherein the direct-current power supply section includes a detecting device for detecting an overdischarging current from the lithium ion battery at the time of battery backup for the stabilized power supply circuit and controls the stopping of discharging at the time of high-current discharging.

9. The switching power supply unit according to claim 3, wherein the direct-current power supply section includes a temperature measuring device for measuring the ambient temperature of the lithium ion battery and controls the stopping of discharging by the power supply control section at the time of the temperature of the lithium ion battery rising by a predetermined value or more due to high-current discharging.

10. The switching power supply unit according to claim 1, further comprising:

a communication section for giving an information processing unit to which power is supplied from the stabilized power supply circuit advance notice to stop battery backup for the stabilized power supply circuit.

11. The switching power supply unit according to claim 1, wherein the power supply control section includes a rush current restraint device for restraining a rush current from flowing to a capacitor connected between output terminals of the direct-current power supply section.

12. The switching power supply unit according to claim 11, wherein the rush current restraint device includes a circuit for charging the capacitor during the supply of the commercial power supply.

13. The switching power supply unit according to claim 1, wherein a discharging control switch for controlling the discharging of the direct-current power supply section is located in the stabilized power supply circuit and a switch for inhibiting discharging in the discharging route included in the direct-current power supply section is excluded.

14. The switching power supply unit according to claim 1, wherein a radiation plate for power semiconductor elements included in the stabilized power supply circuit is integrated with a section for housing the secondary battery so that heat can be conducted from the power semiconductor elements to the secondary battery via the radiation plate.

15. The switching power supply unit according to claim 14, wherein a cooling fan and a temperature sensor for detecting the temperature of the radiation plate are located near the radiation plate, further wherein the amount of heat conducted from the radiation plate to the secondary battery is controlled.

* * * * *

UNITED STATES PATENT AND TRADEMARK OFFICE
CERTIFICATE OF CORRECTION

PATENT NO.     : 6,879,132 B2
DATED          : April 12, 2005
INVENTOR(S)    : Kazuhiro Oki et al.

It is certified that error appears in the above-identified patent and that said Letters Patent is hereby corrected as shown below:

<u>Title page,</u>
Item [73], Assignees, please add -- Kabushiki Kaisha Toshiba, Tokyo (JP) --.

Signed and Sealed this

Sixth Day of December, 2005

JON W. DUDAS
*Director of the United States Patent and Trademark Office*